INVENTORS
Watson W Tranter
Harry C. Hollinger
BY Walter W. Burns
Attorney

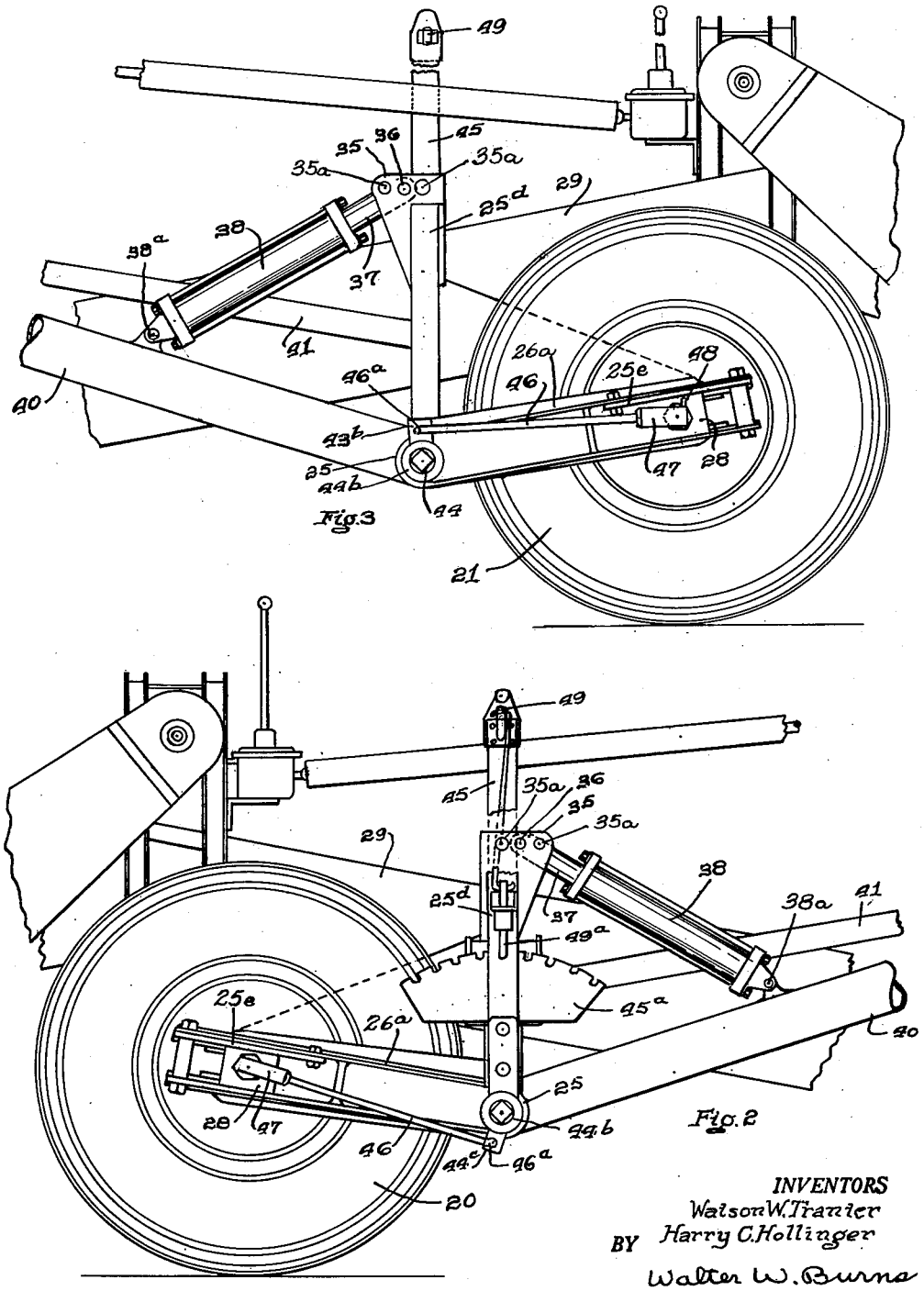

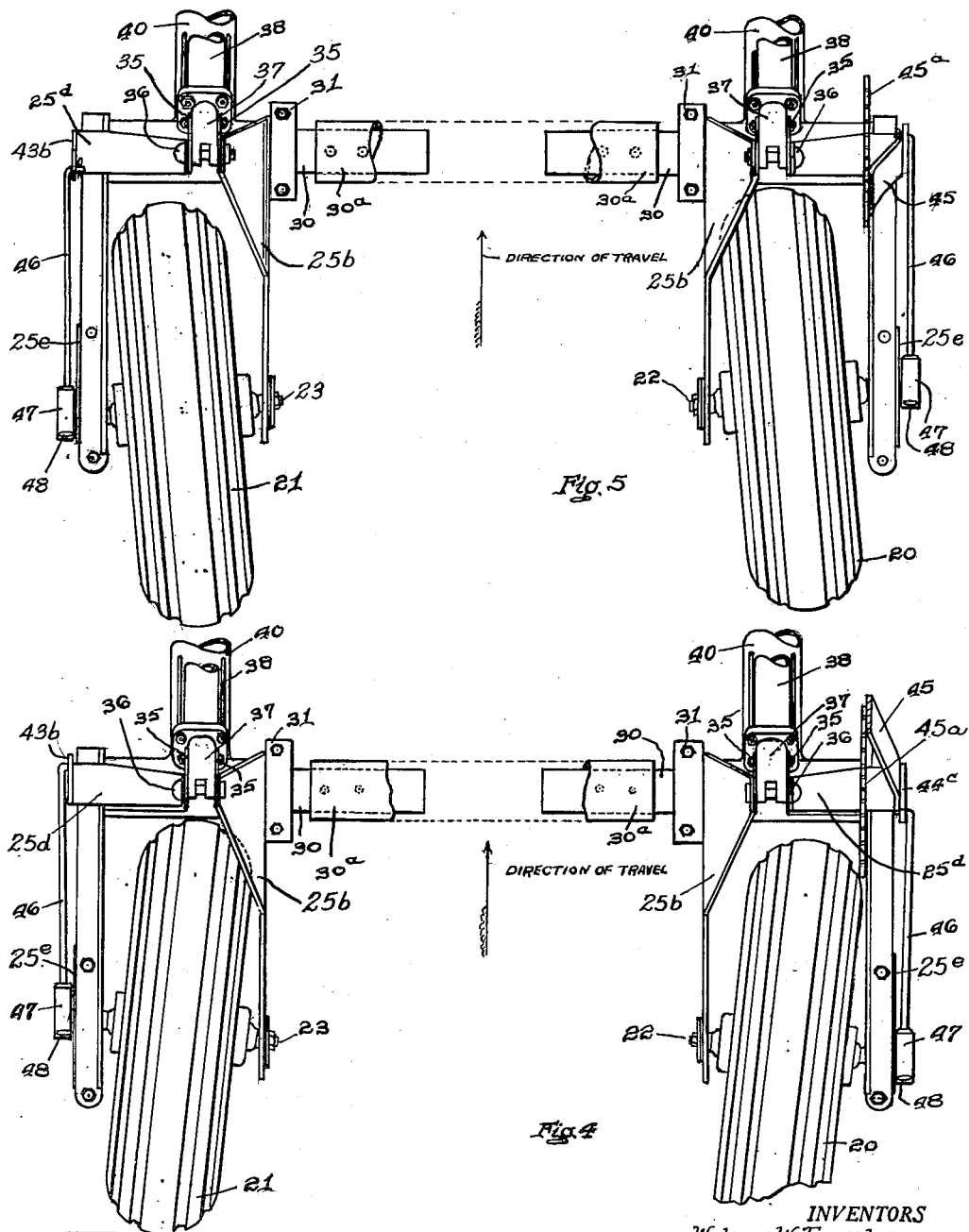

March 17, 1953 W. W. TRANTER ET AL 2,631,863
SIDE HILL WHEEL SUPPORT FOR IMPLEMENTS AND THE LIKE
Filed April 20, 1948 5 Sheets-Sheet 4
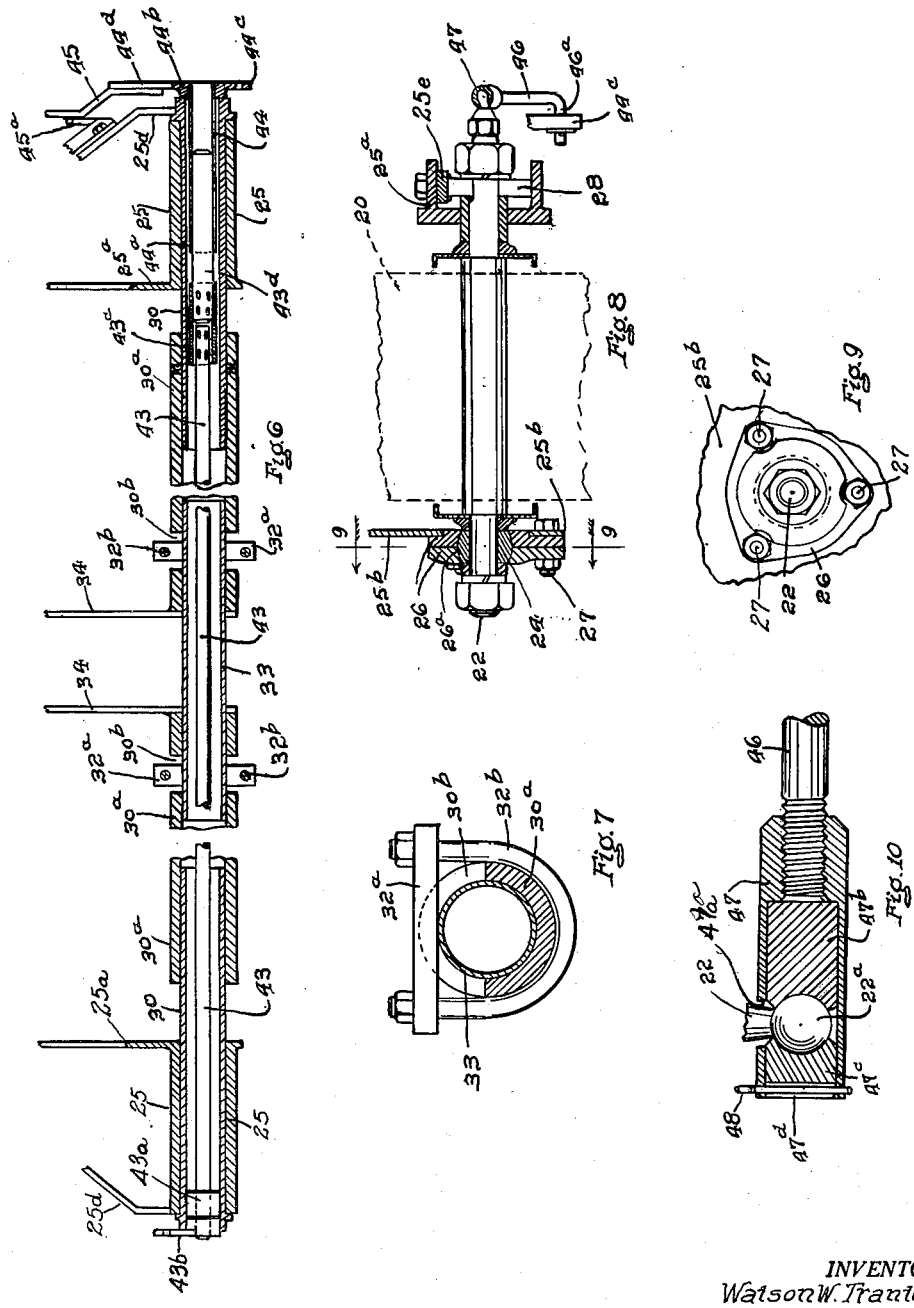
INVENTORS
Watson W. Tranter
Harry C. Hollinger
BY Walter W. Burns
Attorney

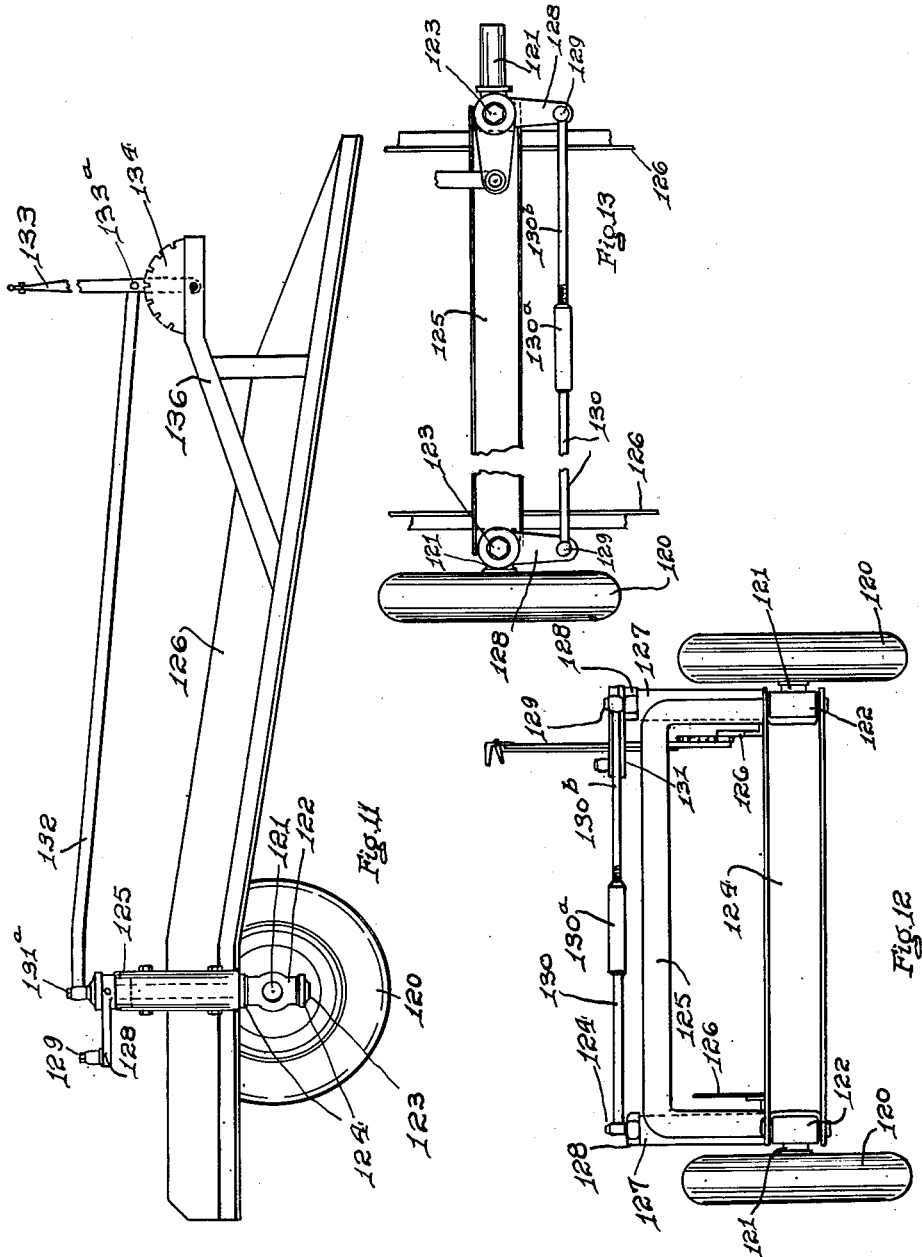

UNITED STATES PATENT OFFICE 2,631,863

SIDE HILL WHEEL SUPPORT FOR IMPLEMENTS AND THE LIKE

Watson W. Tranter and Harry C. Hollinger, York, Pa., assignors to A. B. Farquhar Company, York, Pa., a corporation of Pennsylvania Application April 20, 1948, Serial No. 22,126

10 Claims. (Cl. 280—80)

This invention relates to implement supporting wheels and is particularly adapted for use on implements and other vehicles used in contour and side hill work.

The primary object of the invention is the provision of an improved wheel construction for an implement or vehicle which will be useful in side hill travel and have a tendency to prevent side movement of the vehicle or implement upon which it is installed.

Another object of the invention is the provision of an improved wheel control mechanism for vehicles or implements wherein a plurality of wheels are simultaneously and similarly angled with relation to the normal line of travel.

Still another object of the invention is a wheel support construction for a vehicle or implement wherein a pair of wheels may be similarly and simultaneously angled with relation to the normal line of travel, with provision for adjusting the wheels laterally with relation to each other to obtain the desired distance between rows of varying widths.

A further object of the invention is the provision of an improved construction for angling a wheel which has an arch support.

A still further object of the invention is the provision of an improved wheel angling construction wherein one end of the wheel axis swings about the other end of the axis and is provided with a lever control means for adjusting and locking the wheel in any desired angular position.

Still another object of the invention is the provision of an improved wheel angling mechanism wherein a bell crank shaft connection extends between two ground wheels with means including crank arms to oppositely move the outer ends of the axle in opposite directions while keeping the wheel planes substantially parallel.

Other and further objects will be apparent from a reading of the complete specifications.

Referring to the drawing wherein is illustrated an embodiment of the invention:

Fig. 2 is a side elevation of the right wheel showing the outside support for the wheel and the hand lever with its locking mechanism.

Fig. 3 is a side elevation of the wheel opposite to that of Fig. 1 and illustrating its angling mechanism.

Fig. 4 is a plan view showing the wheels angled to the right.

Fig. 5 is a view similar to Fig. 4 but with the wheels angled to the left.

Fig. 6 is a transverse vertical sectional view showing the transverse supporting tube in section to illustrate the connection of one end of the angling mechanism with that of the other to cause both wheels to operate in unison, and taken approximately on the line 6—6 of Fig. 1.

Fig. 7 is an enlarged vertical sectional view of the line 7—7 of Fig. 1.

Fig. 8 is an enlarged detail vertical sectional view on the line 8—8 of Fig. 1.

Fig. 9 is a detail of parts shown in Fig. 8.

Fig. 10 is a detail sectional view taken on line 10—10 of Fig. 1.

Fig. 11 is a side view of a modification applied to another form of potato digger with one wheel removed for clearness of illustration.

Fig. 12 is a detail rear elevation of the invention illustrated in Fig. 11.

Fig. 13 is a plan view of the structure of Fig. 12.

Similar reference characters refer to the same or similar parts throughout the specification and drawing.

Figure 1:
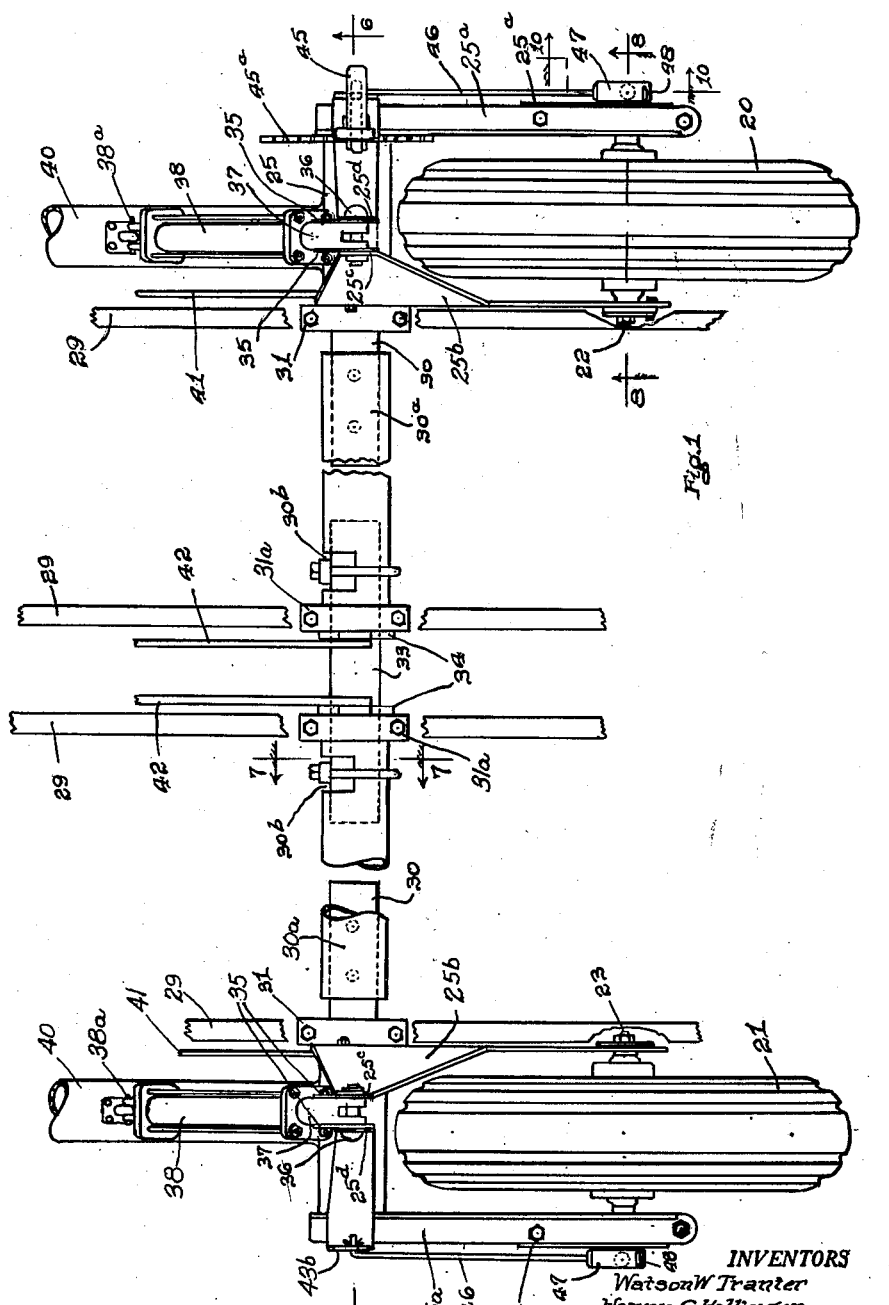
Fig. 1 is a plan view of the invention as applied to the frame of a potato digger with parts cut away for clearness of illustration.

Referring particularly to Fig. 1, the ground wheel of a potato digger is designated by the reference character 20. This wheel 20 is the wheel on the right side as illustrated and the wheel 21 is located on the left side. These wheels 20 and 21 are mounted to rotate on swinging axles or shafts 22 and 23. The axle or shaft 22, for example, has a ball joint at its inner end which enables the axle or shaft 22 and its wheel 20 to oscillate in a horizontal plane about its inner end as will be described.

This ball joint member is designated as the part 24 as illustrated on Fig. 8. A plate 25b which is an arm of an arch support 25 is pivoted to the potato digger frame and has an opening through which the axle 22 extends and in which the ball joint 24 is held by the bearing members 26. These bearing members 26 are secured to the plate 25b of the arch support 25 by suitable bolts 27. The bearing members 26 have spherical surfaces 26a which are complementary to the surface of the ball joint member 24 and permit a swinging action of the axles or shaft 22. The outer ends of the axles, or shafts, 22 and 23 are mounted in block bearings 28 and slide in the guide assembly 25a. In the embodiment shown, the shafts 22, 23 are illustrated as being, although not necessarily so, non-rotative in the block bearings 28. These block bearings 28 are slidably supported by the guides 25e on the outer arms 25b of the arch support 25 already referred to.

The arch supports 25 are mounted rigidly on the transversely extending hollow tubular members 30 which are journalled in outer bearings 31 which are mounted beneath and are secured to the respective elevator frames 29 of the potato digger. Spot-welded or otherwise rigidly secured to the tubular members 30 are larger sleeve members 30a which have cutaway portions 30b to receive the clamp plates 32a, each of which coacts with its U-shaped clamp member 32b. The clamp members 32a, 32b coact with a separate middle tubular member 33 and the cutaway portion 30b to hold the tubular member 33 in fixed but adjustable relation to the hollow tubular member 30, 30a for a purpose to be described.

Welded or otherwise secured to the end of each member 30a is an arm 34 which extends upwardly for a purpose to be later described. Just outward of the arms 34 are inner bearings 31a, Fig. 1, which are complementary to the bearings 31 already described and together with the bearings 31, support the elevator frames 29 of the potato digger in a well-known manner. The potato digger of the present embodiment is one of the two-row type.

When the digger is adjusted for a different distance between row-centers, the operator simply loosens the clamp members 32a, 32b and the two elevator frames 29 and their mechanisms of the digger are moved apart. When in the proper spaced relation, the clamp members 32a, 32b are tightened on each side and the sidewise adjustment for the swinging arch supports is complete.

Within the tubular members 30, 30a and 33 is the connection for the mechanism for angling the wheels, which mechanism will now be described.

As already described, the members 30, 30a and 33 are tubular in form. The purpose of this construction will presently be made clear.

Forming a part of and at the upper end of each arch inner support 25 is secured an upwardly extending arm 25c. In a like manner, from the respective outer sides of the arch supports 25 are upwardly extending arms 25d. These arms 25c and 25d extend toward each other and between their upper ends support the U-shaped bracket 35. This bracket 35 is provided with a plurality of holes 35a. Secured adjustedly in these holes 35a are pins 36. These pins 36 connect the U-shaped member with the end of the piston rod 37 which coacts with the cylinder 38. The cylinder 38 is pivoted at 38a on the tubular main frame 40 of the potato digger. When it is desired to change the height of the digger elevator frame 29 which is supported by the bearings 31, in which the tube 30 oscillates, hydraulic pressure in applied to the interior of the cylinders 38. This causes the pistons 37 to be forced outwardly and through the U-shaped brackets 35, the arch bracket 25 and its plates 25a, 25b, and arms 25c and 25d, will all turn about the axes of the wheels 20 with the result that the tube 30 and its cooperating parts will cause the tube 30 to be lifted. Since the elevator frame 29 of the potato digger is supported by the tube 30 and its bearings 31, 31a, it follows that as the tube 30 is raised, the elevator frame 29 will also be raised. To assist in the raising operation, links 41 are pivoted to the side members 25a and extend forwardly to connect to a suitable mechanism (not shown) which is also connected to similar links 42 which are pivoted to the upwardly extending arms 34 at the same distance from the center of the tubular member 30 as are the pivots of the links 41 on the plate members 25a. The function of the links 41 is to transmit the lifting force to the links 42 by way of the coacting mechanism not shown, to act upon the lever arms 34 to assist in lifting the tubular members 30 and the potato digger elevator frame carried thereby. However, the details of the lifting mechanism of the potato digger unit and the details of construction of the implement here exemplified as a potato digger, are not a part of this invention per se and for this reason, will not be further described.

Just as the tubular member 30 and its coacting parts 30a and 33 form a power shaft through which a uniform lifting effort can be applied to both sides of the implement, so, is there provided a transverse power member to connect both sides of the implement to uniformly and simultaneously angle the wheels for the purposes of this invention. There is provided a transverse rod or shaft 43 which is here shown as being within the tubular member 30, 30a, 33 and is of a length to be nearly equal to the width of the implement. At the left side of the implement this rod or shaft 43 is provided with a centering collar or enlargement 43a which has a cylindrical outer surface slightly smaller than the interior of the tube 30. This insures that the rod or shaft 43 will be centered and at the same time be permitted to turn when it performs its duty in operation.

At the left end, as illustrated in Figs. 1, 3, 4, 5 and 6, there is provided an upstanding lever arm 43b which is rigid with and turns with the rod or shaft 43. At the right end as illustrated in Fig. 6, there is shown a square section 43c which is spotwelded or otherwise fixedly secured to the rod or shaft 43. Also spotwelded to the square section 43c is a square rod 43d which extends nearly to the right side of the implement. Within the arch support 25 at the right side of the implement is a square tubular shaft member 44, the inside cross-section of which is square and slightly larger than the corresponding outside surface of the square section 43d. At the inner end of the square tubular member 44 is a collar or guide member 44a which is welded or otherwise suitably secured to the square tubular member 44. At the outer end of the tubular member 44 is a closure member 44b which has a suitable bearing surface for contact with the inside of the tubular member 30. Suitable means for retaining the closure member 44b in its place, while not shown, is provided. From the above, it is clear that any turning of the shaft 43 from a rotary force applied at either end, will move both ends at the same time and for the same distance.

At the outer end of the closure member 44b, are two arms 44c and 44d—one arm 44c extending downwardly a distance corresponding to the distance of upward extension of the arm 43b at the left end of the rod or shaft 43, the other arm 44d, extending upwardly for connection to the hand operating lever about to be described.

In order to turn the shaft 43 and those portions of the mechanism attached thereto, there is provided a hand lever 45 which is suitably secured to the upward extending arm 44d, the two together forming a hand operating lever for controlling the angling mechanism. Secured to the arm 25d in any suitable manner as by welding, is the toothed quadrant 45a which is in position to cooperate with the hand lever 45 to hold the latter in adjusted position relative to the arch support 25, its tubular member 30, and the wheels 20.

From the foregoing description, it is believed to be clear that when the lever 45 is placed in locked adjustment with the toothed quadrant 45a, the arched support 25, its tubular member 30, the adjustable tubular member 33 will be held rigid each with the other regardless of the position of the piston rod in its cylinder 38. Due to the square shapes of the interior of the tube section 44 and the coacting exterior of the square rod 43d, it will be obvious that when the adjustment for the widths of the potato rows is made by changing the adjustment of the relation of the tubular member 33 and its coacting tubular members 30, the sliding connection between the square members 43d and 44 will maintain the operative connection between the lever arms 44c and 43b.

The construction and use of the arms 43b and 44c will now be set forth. It is to be noted that the arm 43b extends upwardly while the arm 44c extends downwardly. Pivotally connected to the outer end of each of the arms 43b and 44c is a link 46. Each of the links 46 is provided at one end with a right angular turn 46a which pivotally connects to one of the arms 43b, 44c. At the rearward end of each link 46 is screw-threadedly attached one member 47 of a semi-universal connection which connects the link 46 to the shaft or axle 22 as illustrated in Figs. 8 and 10. The ball end 22a of the shaft 22 passes through an opening 47a in the side of the casing 47. A pair of blocks 47b and 47c are provided with spherical surfaces coacting with the spherical surface of the ball shaped member 22a and with each other to hold the casing 47 in proper relation to the shaft or axle 22. The block 47c is threaded within the casing 47 and is held in its final adjustment by a cotter pin 48 which passes through suitable holes in the casing 47 and a corresponding slot 47d.

It is thus clear that when the links 46 are moved in directions generally along their axis, the axles 22, 23 will be moved and the wheels 20, 21 will be angled.

When the vehicle or implement encounters a side hill situation and it is realized that if not counteracted, the vehicle or implement will have a tendency to slide down hill and out of the line of travel which it is desired to have it travel, the situation is easily corrected in the following manner: If the tendency for the vehicle or implement is to slide downwardly and to the left, the operating lever 45 is grasped by the operative and moved forwardly with the grip 49 on the lever 45 in its upward position and its detent member 49a in its raised position away from the notches of the quadrant 45a.

This results in action taking place at both sides of the vehicle or implement simultaneously and to produce similar results with regard to the wheels. The first action is on the rod or shaft 43, 44 which extends across the implement and in this embodiment is within the tubular members 30, 33. As the rod or shaft members 43, 44, is attached to the hand lever 45, it follows that forward movement of the lever will operate the rod or shaft members 43, 44 in the same direction of rotation. At the ends of the rod or shaft members 43, 44 are the short lever arms 43b and 44c, the former extending upwardly and the latter extending downwardly. The result of this relative positioning of the lever arms 43b and 44c is that the link 46 on the right side of the implement moves to the rear while the link 46 on the left of the implement moves to the front. These movements of the links 46 cause the outer end of the axle 23 to be swung forward and the outer end of the axle or shaft 22 on the right side of the machine to swing rearwardly. The net result of these coacting movements is that both wheels are inclined toward the right as illustrated in Fig. 4. When the angling of the wheels is at the proper degree, the hand grip lever 49 is released, and the detent 49a falls into the nearest notch of the quadrant 45a. If the inclination of the hill decreases as the implement goes forward, the hand operating lever 45 is adjusted to a more rearward position and if the hillside becomes steeper, the hand operating lever is moved to a more forward position there adjusted.

In the case of a hillside sloping downwardly to the right, it is necessary to have the wheels inclined to the left. To bring about this result, it is only necessary to release the detent 49a by gripping the hand grip 49 and then by moving the hand operating lever 45 to the rear. This moves all of the parts in opposite directions to those described above. When the proper place is reached, the grip 49 is released and the detent 49a will fall into the nearest notch of the quadrant 45a.

From the foregoing, it is believed to be clear that the tendency of implements, such as potato diggers, to move out of the normal line of travel on hillsides may be counteracted with a means which will compensate for the slope upon which the vehicle is operating and will permit the ready adjustment and readjustment of the wheels, simultaneously and evenly on both sides of the implement.

I will now describe a modification of the invention which is particularly adapted to potato diggers of the type wherein there is no relative vertical adjustment between the wheels and the frame of the implement.

Referring to Figs. 11, 12 and 13, 120 are the wheels, 121 their axles. The axles 121 are unitary with the king-pin bearing portions or knuckles 122. These bearing portions or knuckles 122 are mounted rigidly on the long king-pins 123, the upper and lower ends of which, are suitably journaled in the flanges of an I-beam axle 124. Secured as by welding to the upper surface of the I-beam 124 is a channel shaped member 125, between the sides of which are mounted the frame members 126 of the implement such as a potato digger.

The frame members 125 are illustrated with the open sides of the channel above and outwardly of the center. In the open sides of the channel at each side and extending upwardly from the top of the I-beam 124, are a pair of journal housings 127, one being above the knuckle 122 on the right side and the other above the knuckle 122 on the left side and in alignment with the axis of their knuckles. The king-pins 123 already referred to are not the usual type but are long enough to extend upwardly beyond the respective tops of the housings 127. Keyed to the respective tops of the long king-pins 123, are bell-crank levers 128 which have at their outer ends the pivot pins 129. Extending between the pivot-pins 129 is a cross link 130 for maintaining the bell-crank levers 128, and by them, the wheels 120, in proper relative parallel position. Intermediate the ends of the link 130 is an adjustment means comprising the interiorly threaded sleeve 130a, within which is threaded the end section 130b of the rod 130. When adjustment in the length of the link 130 is made, it is only necessary to remove one of the pins 129 and turn the rod section 130b until the length for a proper adjustment is obtained. The pin 129 is then replaced.

In order to angle the wheels by means of the construction just described, there is rigidly mounted on the right-hand king-pin 123 a second bell-crank lever arm 131 which extends inwardly of the king-pin 123 at substantially a right angle to the adjacent bell-crank arm 128. Extending forward from the outer end of the bell crank arm 131 and pivoted at 131a is a rod or link 132 which extends to a hand operating lever 133. This hand operating lever 133 is fulcrumed on a quadrant 134 which is rigidly mounted on one of the side members of the potato digger frame 126 and is directly supported by means of the bracket member 136.

When it is desired to angle the wheels the hand operating lever 133 is grasped and its usual grip release is used to release the lever from the quadrant. If it is desired to incline the wheels to the right to counteract a tendency for the machine to drift to the left, the hand operating lever is moved forward. This places compression in the link 132 which causes a clockwise movement of both of the long king-pins 123. This simultaneously moves the wheels to the desired positions. If it is desired to angle the wheels to the left, the hand lever 133 is moved to the rear. It is to be noted that the wheels are moved simultaneously and that they are kept in parallel relation during the movement.

While embodiments of the invention have been set forth in detail, it is to be understood that the disclosures are merely illustrative and that modifications and changes can be made without departing from the spirit of the invention and within its scope as claimed.

Having described the invention in detail, what is claimed, is:

1. A support for a frame of a traction-drawn implement, comprising a pair of ground wheels, each mounted on an axle, U-shaped members carried by the wheels and supported therefrom at the open ends thereof, one end of each axle pivoted on one arm of a respective U-shaped member, the other end of each axle mounted for oscillatory movement on the other arm of the U-shaped member, a tubular member extending across the implement and rigidly connected to the loops of the U-shaped members, a rod extending through the tubular member, means connecting the oscillatory end of each axle with the rod member, to cause a simultaneous movement of the axles and their respective wheels when the rod is moved, to vary the angles of the wheels relative to the normal line of draft while keeping the planes of rotation of the wheels in substantially parallel relation.

2. A support for a frame of a traction-drawn implement, comprising a pair of ground wheels, each mounted on an axle, a pair of U-shaped members, one end of each axle pivoted to one section of a respective U-shaped member, the other end of each axle mounted for oscillatory movement on the other section of the respective U-shaped member, a transverse member extending across the implement and rigidly connected to the loops of the U-shaped members, a transverse rod-member extending across the implement, means operatively connecting the rod with the oscillating ends of the axles to cause corresponding simultaneously movement to both wheels when the rod-member is moved, and to maintain the wheels with their axes of rotation in a substantially parallel relation.

3. A support for a frame of a traction-drawn implement comprising a pair of ground wheels, each mounted on an axle, U-shaped members carried by the wheels and supported therefrom at the open ends thereof, one end of each axle connected to one arm of a U-shaped member, the other end of each axle mounted for oscillatory movement relative to the other respective arm of its U-shaped member, a tubular member extending across the implement and rigidly connected to the loops of the respective U-shaped members, a rotatively oscillatory rod extending through the tubular member, and a bell crank lever pivotally mounted adjacent the ends of the rod with one arm of each connected to its respective end of the rod and connections from each bell crank lever to a corresponding movable end of an axle to simultaneously move the wheels to change the angles of the planes of rotation relative to the normal line of travel and to maintain the planes of rotation substantially in parallel relation during the angling operation.

4. A support for a frame of a traction-drawn implement comprising a pair of ground wheels, each mounted on an axle, U-shaped members carried by the wheels and supported therefrom at the open ends thereof, one end of each axle pivoted on one arm of a U-shaped member, the other end of each axle having an oscillatory movement relative to the other respective arm of its U-shaped member, a tubular member extending across the implement and rigidly connected to the loops of the respective U-shaped members, a rotatively oscillatory rod extending through the tubular member, a bell crank lever pivotally mounted adjacent the ends of the rod with one arm of each connected to its respective end of the rod and connections from each bell crank lever to a corresponding movable end of an axle to simultaneously move the wheels to change the angles of the planes of rotation relative to the normal line of travel and to maintain the planes of rotation substantially in parallel relation during the angling operation, and means on the tubular member to lock the rod in adjusted position to retain the adjustment of the wheels relative to the normal line of travel.

5. A support for a frame of a traction-drawn implement comprising a pair of ground wheels, each mounted on an axle, U-shaped members carried by the wheels and supported therefrom at the open ends thereof, one end of each axle pivoted to one arm of a U-shaped member, the other end of each axle having an oscillatory movement relative to the other respective arm of its U-shaped member, a tubular member extending across the implement and rigidly connected to the loops of the respective U-shaped members, a rotatively oscillatory rod extending through the tubular member, a bell crank lever pivotally mounted adjacent the ends of the rod with one arm of each connected to its respective end of the rod, and connections from each bell crank lever to a corresponding movable end of an axle to simultaneously move the wheels to change the angles of the planes of rotation relative to the normal line of travel and to maintain the planes of rotation substantially in parallel relation during the angling operation, means on the tubular member to lock the rod in adjusted position to retain the adjustment of the wheels relative to the normal line of travel, and means for adjusting the tubular member and rod transversely of the line of travel for various widths of rows.

6. A support for the frame of a traction-drawn implement, comprising a pair of ground wheels, each mounted on an axle, U-shaped members carried by the wheels and supported therefrom at the open ends thereof, one end of each axle pivoted on one arm of a U-shaped member, the other end of each axle having an oscillatory movement relative to the other respective arm of its U-shaped member, a tubular member extending across the implement and rigidly connected to the loops of the respective U-shaped members, a rod extending through the tubular member, means connecting the oscillatory end of each axle with the rod member, to cause a simultaneous movement of the axles and their respective wheels when the rod is moved, to vary the angles of the wheels relative to the normal line of draft while keeping the planes of rotation of the wheels in substantially parallel relation, and means for adjusting the tubular member and rod transversely of the line of travel for various widths of rows.

7. A support for a frame of a traction-drawn implement, comprising a pair of ground wheels, each mounted on an axle, U-shaped members carried by the wheels and supported therefrom at the open ends thereof, one end of each axle having a substantially vertical pivot mounted on one arm of the U-shaped member and the other end of the axle having a block in sliding engagement with the other arm of its U-shaped member, a tubular member extending across the implement and rigidly connected to the loops of the respective U-shaped members, an oscillatory rod extending through the tubular member, a bell crank lever pivotally mounted adjacent the ends of the rod with one arm of each connected to its respective end of the rod, and link connections from the ends of the bell crank levers to the blocks of the axles, to simultaneously move the wheels to change the angles of the axles relative to the normal line of draft to retain the axes of the axles in substantially parallel relation during the angling operation.

8. A support for a frame of a traction-drawn implement, comprising a pair of ground wheels, each mounted on an axle, U-shaped members carried by the wheels and supported therefrom at the open ends thereof, one end of each axle having a substantially vertical pivot mounted on one arm of the U-shaped member and the other end of the axle having a block in sliding engagement with the other arm of its U-shaped member, a tubular member extending across the implement and rigidly connected to the loops of the respective U-shaped members, an oscillatory rod extending through the tubular member, a bell crank lever pivotally mounted adjacent the ends of the rod with one arm of each connected to its respective end of the rod, and link connections from the ends of the bell crank levers to the blocks of the axles, to simultaneously move the wheels to change the angles of the axles relative to the normal line of draft and to retain the axes of the axles in substantially parallel relation during the angling operation, and means for adjusting the tubular member and rod transversely of the line of travel for various widths of rows.

9. A support for a frame of a traction-drawn implement, comprising a pair of ground wheels, each mounted on an axle, U-shaped members carried by the wheels and supported therefrom at the open ends thereof, one end of each axle having a substantially vertical pivot mounted on one arm of the U-shaped member and the other end of the axle having a block in sliding engagement with the other arm of its U-shaped member, a tubular member extending across the implement and rigidly connected to the loops of the respective U-shaped members, an oscillatory rod extending through the tubular member, a bell crank lever pivotally mounted adjacent the ends of the rod with one arm of each connected to its respective end of the rod, and link connections from the ends of the bell crank levers to the blocks of the axles, to simultaneously move the wheels to change the angles of the axles relative to the normal line of draft and to retain the axes of the axles in substantially parallel relation during the angling operation, and coacting means connected with the tubular member and with the rod for locking the wheels in any desired position relative to the tubular member and to each other.

10. A support for a frame of a traction-drawn implement, comprising a pair of ground wheels, each mounted on an axle, U-shaped members carried by the wheels and supported therefrom at the open ends thereof, one end of each axle having a substantially vertical pivot mounted on one arm of the U-shaped member and the other end of the axle having a block in sliding engagement with the other arm of its U-shaped member, a tubular member extending across the implement and rigidly connected to the loops of the respective U-shaped members, an oscillatory rod extending through the tubular member, a bell crank lever pivotally mounted adjacent the ends of the rod with one arm of each connected to its respective end of the rod, and link connections from the other ends of the bell crank levers to the blocks of the axles, to simultaneously move the wheels to change the angles of the axles relative to the normal line of draft and to retain the axes of the axles in substantially parallel relation during the angling operation, coacting means connected with the tubular member and with the rod for locking the wheels in any desired position relative to the tubular member and to each other, and means for adjusting the tubular member and rod transversely of the line of travel for various widths of rows.

WATSON W. TRANTER.
HARRY C. HOLLINGER.

REFERENCES CITED

The following references are of record in the file of this patent:

UNITED STATES PATENTS

| Number | Name | Date |
|---|---|---|
| 614,727 | King | Nov. 22, 1898 |
| 724,042 | Rhodes | Mar. 31, 1903 |
| 914,506 | Paul et al. | Mar. 9, 1909 |
| 968,627 | Young | Aug. 30, 1910 |
| 970,515 | Lindgren | Sept. 20, 1910 |
| 1,082,847 | Cushman | Dec. 30, 1913 |
| 1,636,620 | Berry | July 19, 1927 |
| 1,698,980 | Wilson | Jan. 15, 1929 |
| 1,812,827 | Gannet | June 30, 1931 |
| 2,025,520 | Long | Dec. 24, 1935 |
| 2,351,830 | Mitchel et al. | June 20, 1944 |